United States Patent
Serrano et al.

(10) Patent No.: US 11,069,000 B1
(45) Date of Patent: Jul. 20, 2021

(54) PAYMENT PROCESSING SERVICE UTILIZING A DISTRIBUTED LEDGER DIGITAL ASSET

(71) Applicant: BitPagos, Inc., Wilmington, DE (US)

(72) Inventors: Sebastian Serrano, Buenos Aires (AR); Luciana Marcela Gruszeczka, Buenos Aires (AR); Mugur Marculescu, Palo Alto, CA (US)

(73) Assignee: BITPAGOS, INC., Wilmington, DE (US)

( * ) Notice: Subject to any disclaimer, the term of this patent is extended or adjusted under 35 U.S.C. 154(b) by 0 days.

(21) Appl. No.: 15/145,668

(22) Filed: May 3, 2016

Related U.S. Application Data

(60) Provisional application No. 62/288,406, filed on Jan. 28, 2016, provisional application No. 62/180,442, filed on Jun. 16, 2015.

(51) Int. Cl.
*G06Q 40/00* (2012.01)
*G06Q 20/10* (2012.01)

(52) U.S. Cl.
CPC ........... *G06Q 40/12* (2013.12); *G06Q 20/102* (2013.01)

(58) Field of Classification Search
CPC .............................. G06Q 40/12; G06Q 20/102
See application file for complete search history.

(56) References Cited

U.S. PATENT DOCUMENTS

| | | | |
|---|---|---|---|
| 9,047,600 B2 * | 6/2015 | Zhou | G06Q 20/322 |
| 9,818,092 B2 * | 11/2017 | Pennanen | G06Q 20/06 |
| 9,830,580 B2 * | 11/2017 | MacGregor | H04L 9/3236 |
| 9,870,562 B2 * | 1/2018 | Davis | G06Q 20/40 |
| 10,504,179 B1 | 12/2019 | Mcguire et al. | |
| 10,614,430 B2 | 4/2020 | Armstrong et al. | |
| 2012/0278200 A1 | 11/2012 | Coppenolle et al. | |
| 2013/0246233 A1 | 9/2013 | Hakim | |
| 2014/0279645 A1 | 9/2014 | Cohen et al. | |
| 2015/0100475 A1 | 4/2015 | Cummings et al. | |
| 2015/0220928 A1 | 8/2015 | Allen | |
| 2015/0262176 A1 | 9/2015 | Langschaedel et al. | |
| 2015/0269539 A1 * | 9/2015 | MacGregor | G06Q 20/065 705/39 |
| 2015/0294425 A1 * | 10/2015 | Benson | G06Q 40/123 705/31 |
| 2016/0012465 A1 | 1/2016 | Sharp | |
| 2016/0234026 A1 | 8/2016 | Wilkins et al. | |
| 2016/0247229 A1 | 8/2016 | Connolly et al. | |

(Continued)

OTHER PUBLICATIONS

Allison, "Codename Citicoin: Banking giant built three internal blockchains to test Bitcoin technology". International Business Times. Jul. 1, 2015, 4 pages. https://www.ibtimes.co.uk/codename-citicoin-banking-giant-built-three-internal-blockchains-test-bitcoin-technology-1508759.

(Continued)

*Primary Examiner* — Ramsey Refai
(74) *Attorney, Agent, or Firm* — Van Court & Aldridge LLP

(57) ABSTRACT

Systems, methods, and computer-readable media for a payment processing service utilizing a distributed ledger digital asset are provided. A payment processing service subsystem may provide payment processing services for merchants that wish to receive customer payments as a distributed ledger digital asset rather than as a fiat money asset.

19 Claims, 3 Drawing Sheets

(56) References Cited

U.S. PATENT DOCUMENTS

| | | |
|---|---|---|
| 2016/0292783 A1 | 10/2016 | Nair |
| 2016/0335628 A1 | 11/2016 | Weigold |
| 2016/0350749 A1 | 12/2016 | Wilkins et al. |
| 2017/0024813 A1 | 1/2017 | Crouspeyre et al. |
| 2017/0046651 A1 | 2/2017 | Lin et al. |
| 2017/0046689 A1 | 2/2017 | Lohe et al. |
| 2017/0048209 A1 | 2/2017 | Lohe et al. |
| 2017/0048216 A1 | 2/2017 | Chow et al. |
| 2017/0048234 A1 | 2/2017 | Lohe et al. |
| 2017/0048235 A1 | 2/2017 | Lohe et al. |
| 2017/0061396 A1 | 3/2017 | Melika et al. |
| 2017/0083907 A1 | 3/2017 | McDonough et al. |
| 2017/0085545 A1 | 3/2017 | Lohe et al. |
| 2017/0085555 A1 | 3/2017 | Bisikalo et al. |
| 2017/0091756 A1 | 3/2017 | Stern et al. |
| 2017/0109735 A1 | 4/2017 | Sheng et al. |
| 2017/0178237 A1 | 6/2017 | Wong |
| 2017/0228705 A1 | 8/2017 | Sandor et al. |
| 2017/0270492 A1 | 9/2017 | Donovan et al. |
| 2017/0352079 A1 | 12/2017 | Nagao |
| 2018/0047111 A1 | 2/2018 | Vieira et al. |
| 2019/0087893 A1 | 3/2019 | Pellew |

OTHER PUBLICATIONS

Eha, "What's So Smart About Smart Contracts?" American Banker 126.6: 34. Jun. 1, 2016, 4 pages.

Groshoff, "Kickstarter My Heart: Extraordinary Popular Delusions and the Madness of Crowdfunding Constraints andBitcoin Bubbles", 5 Wm. & Mary Bus. L. Rev. 489 (Apr. 2014), 71 pages.

Martinson et al. "Bitcoin and the secured lender", Banking & Financial Services Policy Report 33.6: 13(8), Jun. 2014, 11 pages.

Watanabe et al. "Blockchain Contract: A Complete Consensus using Blockchain". 2015 IEEE 4th Global Conference onConsumer Electronics (GCCE), Oct. 27-30, 2015, 2 pages.

Watanabe et al. "Blockchain Contract: Securing a Blockchain Applied to Smart Contracts". 2016 IEEE InternationalConference on Consumer Electronics (ICCE), Jan. 7-11, 2016, 2 pages.

Williams, "Fractional Reserve Banking in Grain". Journal of Money, Credit and Banking. vol. 16, No. 4, Part 1 (Nov. 1984), pp. 488-496 (10 pages).

Ceruleo. "Bitcoin: A rival to fiat money or a speculative financial asset?". Master Thesis, Libera Universita Internazionale degli Studi Sociali "Guido Carli" (LUISS). 2014. https://tesi.luiss.it/13806/. Written Academic Year 2013/2014. Date Deposited: Apr 13, 2015. Last Modified: May 20, 2015. (Year: 2014), 101 pages.

Hughes et al. "Advancing a Framework for Regulating Cryptocurrency Payments Intermediaries." Yale Journal on Regulation, vol. 32, No. 2, Summer 2015, p. 495-559. HeinOnline. (Year: 2015).

Yermack. "Is Bitcoin a Real Currency? An Economic Appraisal". NBER Working Paper Series. Working Paper 19747. Dec. 2013, Revised Apr. 2014. 24 pages. http://www.nber.org/papers/w19747 (Year: 2013).

Lichtenwald, "The State of the P2P Bitcoin Lending Industry". Lend Academy, Aug. 21, 2015, 22 pages, https://www.lendacademy.com/the-state-of-the-p2p-bitcoin-lending-industry/.

Snitkof, "Bitcoin-Powered Lending with BTCJam and Bitbond." May 26, 2015, 10 pages, https://www.orchardplatform.com/blog/bitcoin-powered-lending-with-btcjam-and-bitbond/.

Wack, "Handle with Care: Startups Blend Bitcoin with P-to-P Lending", American Banker, Aug. 19, 2015, 5 pages, https://www.americanbanker.com/news/handle-with-care-startups-blend-bitcoin-with-p-to-p-lending.

* cited by examiner

US 11,069,000 B1

PAYMENT PROCESSING SERVICE UTILIZING A DISTRIBUTED LEDGER DIGITAL ASSET

CROSS-REFERENCE TO RELATED APPLICATION(S)

This application claims the benefit of prior filed U.S. Provisional Patent Application No. 62/180,442, filed Jun. 16, 2015, and prior filed U.S. Provisional Patent Application No. 62/288,406, filed Jan. 28, 2016, each of which is hereby incorporated by reference herein in its entirety.

TECHNICAL FIELD

This disclosure relates to a payment processing service utilizing a distributed ledger digital asset.

BACKGROUND OF THE DISCLOSURE

Conventional payment processing services have several disadvantages including, but not limited to, high transaction fees and volatility tied to centralized currency systems.

SUMMARY OF THE DISCLOSURE

This document describes systems, methods, and computer-readable media for a payment processing service utilizing a distributed ledger digital asset.

For example, a method may include obtaining at a payment processing subsystem a distributed ledger digital asset from a distributed ledger digital asset network subsystem, receiving payment at the payment processing subsystem from at least one of a customer client subsystem and a fiat money asset network subsystem, and transmitting at least a portion of the distributed ledger digital asset from the payment processing subsystem to a merchant client subsystem based on the received payment.

As another example, a payment processor subsystem may include a communications component and a processor operative to obtain, via the communications component, a distributed ledger digital asset from a first remote subsystem, receive, via the communications component, payment from a second remote subsystem, and transmit, via the communications component, at least a portion of the distributed ledger digital asset to a third remote subsystem based on the payment.

As another example, a non-transitory computer-readable medium may include computer-readable instructions recorded thereon for obtaining at a payment processing subsystem a distributed ledger digital asset from a distributed ledger digital asset network subsystem, receiving payment at the payment processing subsystem from at least one of a customer client subsystem and a fiat money asset network subsystem, and transmitting at least a portion of the distributed ledger digital asset from the payment processing subsystem to a merchant client subsystem based on the received payment.

This Summary is provided to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which.

DETAILED DESCRIPTION OF THE DISCLOSURE

Figure 1:
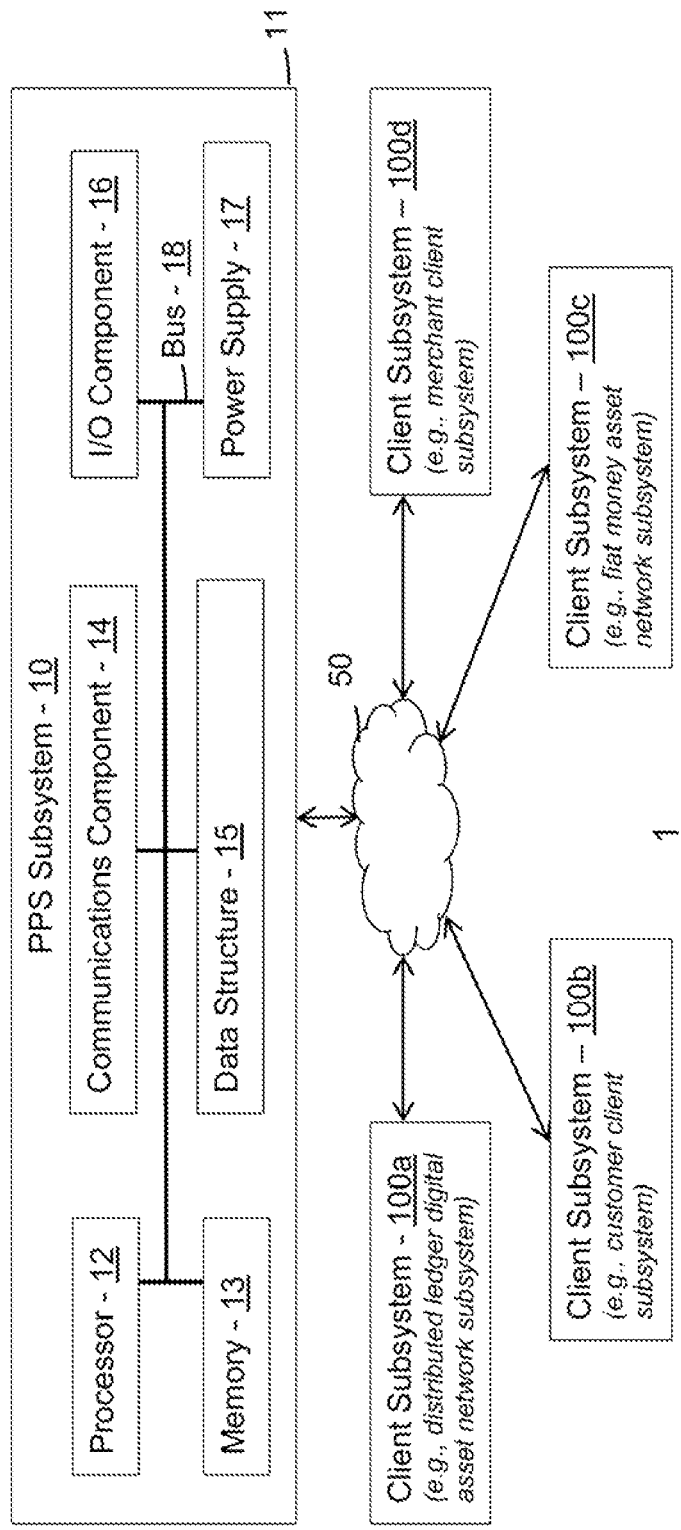
FIG. 1 is a schematic view of an illustrative system for a payment processing service of the disclosure.
Figure 2:
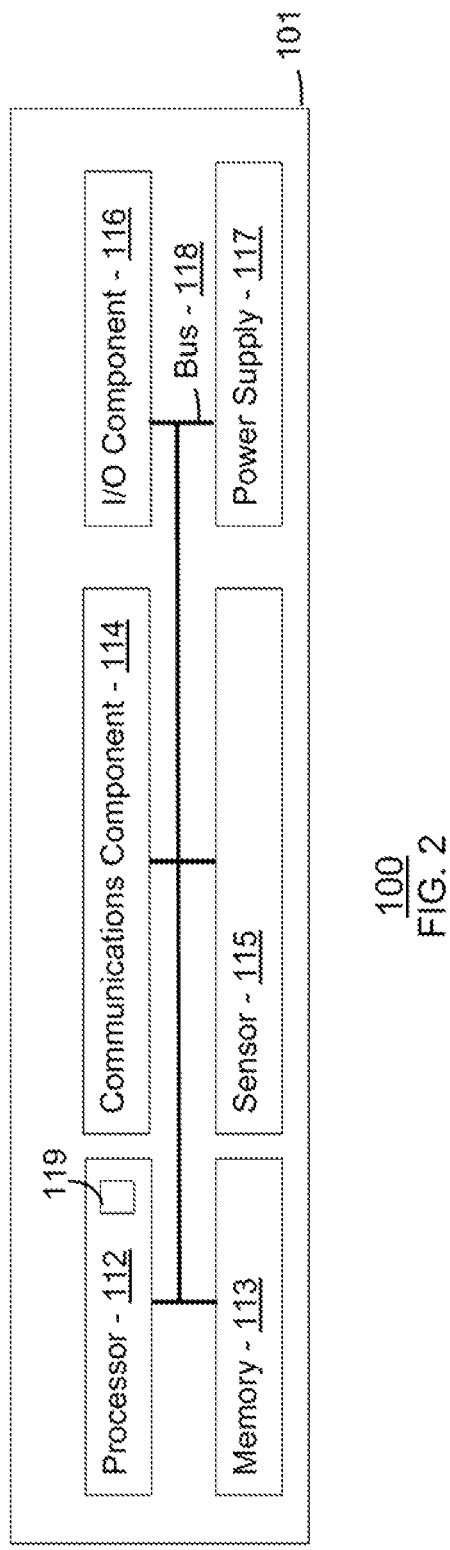
FIG. 2 is a more detailed schematic view of a client subsystem of the system of FIG. 1.
Figure 3:
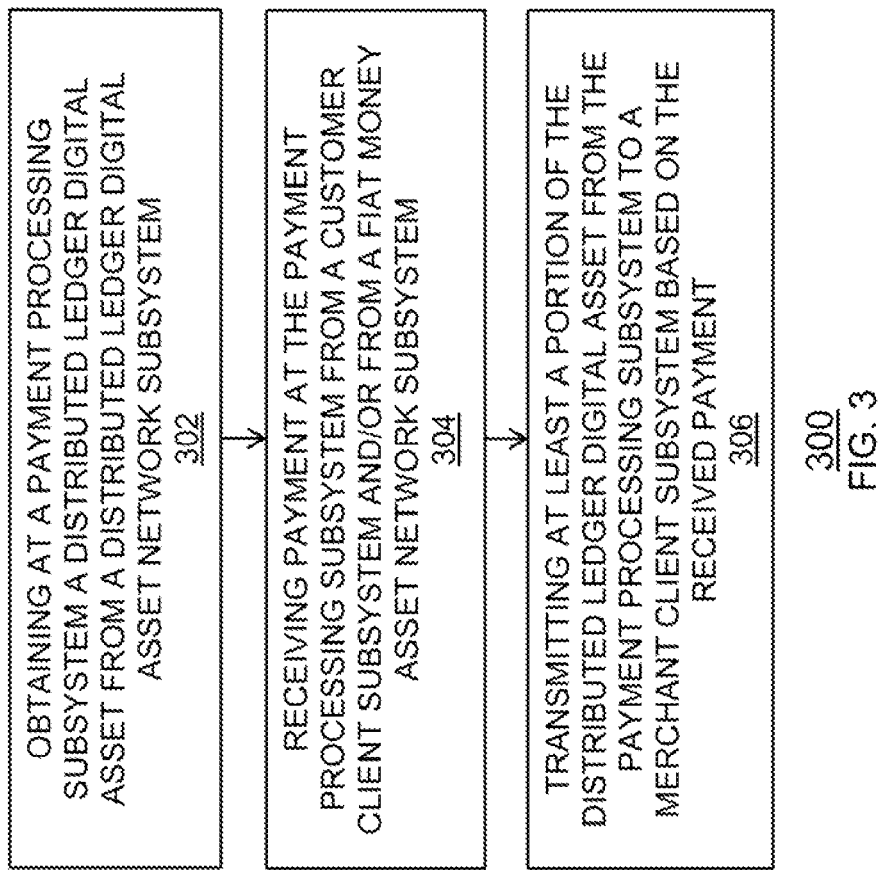
FIG. 3 is a flowchart of an illustrative process for providing features of the service of the disclosure.

FIG. 1 shows a system 1 in which a payment processing service utilizing a distributed ledger digital asset may be facilitated amongst various client subsystems 100, FIG. 2 shows further details with respect to a particular embodiment of a client subsystem 100 of system 1, and FIG. 3 is a flowchart of an illustrative process for using the payment processing service.

DESCRIPTION OF FIG. 1 AND FIG. 2

FIG. 1 is a schematic view of an illustrative system 1 in which payment processing may be facilitated utilizing distributed ledger digital assets (e.g., a decentralized currency or currency issued by decentralized distributed ledgers and/or by centralized distributed ledgers). For example, as shown in FIG. 1, system 1 may include a payment processing service ("PPS") subsystem 10, various client subsystems 100 (e.g., client subsystems 100a-100d), and a communications network 50 through which PPS subsystem 10 and at least one client subsystem 100 may communicate and/or through which two client subsystems 100 may communicate.

As shown in FIG. 2, and as described in more detail below, a client subsystem 100 may include a processor component 112, a memory component 113, a communications component 114, a sensor 115, an input/output ("I/O") component 116, a power supply component 117, and/or a bus 118 that may provide one or more wired or wireless communication links or paths for transferring data and/or power to, from, or between various other components of client subsystem 100. I/O component 116 may include at least one input component (e.g., button, mouse, keyboard) to receive information from a user and/or at least one output component (e.g., audio speaker, video display, haptic component) to provide information to a user, such as a touch screen that may receive input information through a user's touch of a display screen and that may also provide visual information to a user via that same display screen. Memory 113 may include one or more storage mediums, including for example, a hard-drive, flash memory, permanent memory such as read-only memory ("ROM"), semi-permanent memory such as random access memory ("RAM"), any other suitable type of storage component, or any combination thereof. Communications component 114 may be provided to allow client subsystem 100 to communicate with one or more other subsystems 100 or servers or PPS 10 using any suitable communications protocol (e.g., via communications network 50). Communications component 114 can be operative to create or connect to a communications network (e.g., network 50). Communications component 114 can provide wireless communications using any suitable short-range or long-range communications protocol, such as Wi-Fi (e.g., a 802.11 protocol), Bluetooth, radio frequency systems (e.g., 1200 MHz, 2.4 GHz, and 5.6 GHz communication systems), infrared, protocols used by wireless and cellular telephones and personal e-mail devices, or any other protocol supporting wireless communications. Communications component 114 can also be operative to connect to a wired communications network or directly to another data source wirelessly or via one or more wired connections. Sensor 115 may be any suitable sensor that may be configured to sense any suitable data for device 100 (e.g., location-based data via a GPS sensor system). Power supply 117 can include any suitable circuitry for receiving and/or generating power, and for providing such power to one or more of the other components of client subsystem 100. Client subsystem 100 may also be provided with a housing 101 that may at least partially enclose one or more of the components of client subsystem 100 for protection from debris and other degrading forces external to client subsystem 100. Each component of client subsystem 100 may be included in the same housing 101 (e.g., as a single unitary device, such as a laptop computer or portable media device) and/or different components may be provided in different housings (e.g., a keyboard input component may be provided in a first housing that may be communicatively coupled to a processor component and a display output component that may be provided in a second housing). In some embodiments, client subsystem 100 may include other components not combined or included in those shown or several instances of the components shown.

Processor 112 may be used to run one or more applications, such as an application 119 that may be accessible from memory 113 and/or any other suitable source (e.g., from PPS subsystem 10 via an active internet connection). Application 119 may include, but is not limited to, one or more operating system applications, firmware applications, communication applications, internet browsing applications (e.g., for interacting with a website provided by PPS subsystem 10 for enabling client subsystem 100 to interact with an online service), payment processing applications (e.g., a web application or a native application that may be at least partially produced by PPS subsystem 10 for enabling client subsystem 100 to interact with an online service), or any other suitable applications. For example, processor 102 may load an application 119 as a user interface program to determine how instructions or data received via an input component of I/O component 116 or other component of client subsystem 100 may manipulate the way in which information may be stored and/or provided to the user via an output component of I/O component 116. As one example, application 119 may provide a user with the ability to interact with a payment processing service or payment processing service platform ("PPSP") of PPS subsystem 10, where application 119 may be a third party application that may be running on client subsystem 100 (e.g., an application associated with PPS subsystem 10) that may be loaded on client subsystem 100 via an application market, such as the Apple App Store or Google Play, or that may be accessed via an internet application or web browser (e.g., by Apple Safari or Google Chrome) that may be running on client subsystem 100 and that may be pointed to a uniform resource locator ("URL") whose target or web resource may be managed by or otherwise affiliated with PPS subsystem 10.

PPS subsystem 10 may include a processor component 12 that may be similar to processor 112, a memory component 13 that may be similar to memory component 113, a communications component 14 that may be similar to communications component 114, an I/O component 16 that may be similar to I/O component 116, a power supply component 17 that may be similar to power supply component 117, and/or a bus 18 that may be similar to bus 118. Moreover, PPS subsystem 10 may include one or more data sources or data structures 15 that may include any suitable data and/or applications (e.g., application 119 that may be accessed by a subsystem 100 or an application that may be run by processor 12 of PPS subsystem 10) for facilitating a payment processing service or PPSP that may be provided by PPS subsystem 10 to one or more client subsystems 100. Some or all portions of PPS subsystem 10 may be operated, managed, or otherwise at least partially controlled by an entity responsible for providing a payment processing service to one or more users.

PPS subsystem 10 may communicate with one or more client subsystems 100 via communications network 50. Network 50 may be the internet or any other network, such that when interconnected, a client subsystem 100 may access information (e.g., from data structure 15 of PPS subsystem 10, as may be provided as a payment processing service via processor 12 of PPS subsystem 10) as if such information were stored locally at that client subsystem 100 (e.g., in memory component 113).

PPS subsystem 10 may be operative to provide payment processing services for merchants that may wish to receive customer payments as a distributed ledger digital asset (e.g., as a digital cryptocurrency or digital money (e.g., bitcoin from a block chain or distributed ledger of a decentralized network or Citicoin from a block chain or distributed ledger or distributed database of one or more centralized networks (e.g., of Citibank or of any other institution and/or its agents))) rather than as a fiat money asset (e.g., as a real currency or real money government currency (e.g., U.S. dollars, pesos, etc.)). Therefore, both decentralized distributed ledger digital assets and centralized distributed ledger digital assets may be provided to merchants by PPS subsystem 10. Any suitable distributed ledger technology may be utilized, such as sidechain technology with public or private networks and/or alternate blockchains within public or private environments.

As one example of such a distributed ledger digital asset, a bitcoin (with a lowercase "b") may be a unit of virtual currency that may depend on a computer protocol called Bitcoin (with a capital "B") for its distributed global ledger. Bitcoin (the protocol) may not be administered by any central authority. That is, there may be no middleman between the sender and receiver. In fact, there may be no company or agent thereof or even an individual responsible for the administration of the Bitcoin protocol. A single unit of value, a bitcoin, may not be a promise by any central authority to pay its worth in gold or any other commodity. Bitcoin may thus be referred to as a "decentralized" digital currency or a digital asset from a distributed ledger of a decentralized network. In lieu of a central authority, the Bitcoin protocol may run on the Internet across hundreds of thousands or any other suitable number of computers that may securely and transparently settle and confirm transactions (e.g., many independent client subsystems 100a forming a decentralized Bitcoin network). Anyone with a home computer or mobile telephone may download the open-source software that may permit that computer to join the Bitcoin network, the network that may ensure that each user can save and spend the correct amount of bitcoin.

A Bitcoin user can transact directly with another Bitcoin user by means of their "Bitcoin addresses." By way of these addresses, which could be correlated to what may be typically referred to as accounts, users of the Bitcoin network may send bitcoin back and forth, just as users of the United States dollar might exchange dollars back and forth. Bitcoins may be stored in a user's "digital wallet," which may be a feature of the open-source software but also can be provided as a service by virtual currency wallet services and exchangers. Each of these wallets may be able to contain one or more Bitcoin addresses, each of which may be represented by a unique alphanumeric string of characters. To initiate a transaction, the user may simply click a button in or otherwise appropriately interact with the Bitcoin software to send a message to the other computers on the Bitcoin network announcing the transfer of a certain amount of bitcoins from the sender's address to a recipient's address. As payments can be initiated by a user and sent to another user without the intervention of any central authority standing between them, Bitcoin may be known as a decentralized peer-to-peer network. These transactions may be protected by strong cryptographic security and verified by other Bitcoin network participants. The confirmation process may be mathematically complex, but it may be handled automatically and transparently to the users. From a user's perspective, sending and receiving bitcoin may be no more difficult than sending or receiving e-mail.

A user can communicate a Bitcoin address to another in a variety of ways, including, but not limited to, for example, by copying a Bitcoin address provided by the recipient into the Bitcoin software. Alternatively, some programs generate a Quick Response Code ("QR Code") or any other suitable code that may contain a Bitcoin address. Another user may use Bitcoin wallet software on his or her mobile telephone, in conjunction with the camera of the telephone to scan the QR Code and record the other user's address. Once the sender has recorded the recipient's Bitcoin address, the sender may send bitcoin to the recipient over the Bitcoin network.

Due to Bitcoin's "decentralized" nature, it may be able to remain free from certain risks that government-backed currencies may face. Bitcoin may not be subject to inflationary risks or currency controls by a central authority. Thus, Bitcoin can provide an alternative to residents of countries facing high rates of inflation or restrictive monetary policies. Fees may be almost or completely nonexistent in a Bitcoin transaction, regardless of whether the transaction is domestic or international. Many of the world's unbanked and under-banked populations are able to send and receive money at substantially lower costs with PPS subsystem 10 of system 1 than would be incurred using a traditional payment system. Merchants can also receive a higher percentage of their revenues because the fees may be less than those charged by a credit card company.

Like any other currency, users may obtain bitcoin from other users in exchange for goods or services. Many stores, restaurants, charities, and online businesses may accept bitcoin. Other users may obtain bitcoin by buying or trading for them via one of numerous bitcoin exchanges and other service providers that perform those functions.

Although bitcoin has been described, many other suitable types of distributed ledger digital asset may be utilized by the PPSP of PPS subsystem 10. While, in some embodiments, a distributed ledger digital asset (e.g., bitcoin) may be issued from a block chain or distributed ledger of a decentralized network (e.g., the Bitcoin network), in other embodiments, a distributed ledger digital asset (e.g., Citicoin) may be issued from a block chain or distributed ledger or distributed database of one or more centralized networks (e.g., a network of one or more endpoints (e.g., client subsystems 100a) managed by Citibank or any other institution alone or in combination with its agents (e.g., as a central authority administrator)).

PPS software (e.g., data structure or application 15) may act as a payment processing service layer that may be operative to connect a credit card payments processor or any other suitable fiat money asset payment processor with a merchant wishing to take credit card or other fiat money asset payments in dollars but willing to receive bitcoins or any other distributed ledger digital asset instead of local or other currency. Therefore, PPS subsystem 10 may not be a money transmitter, but rather a payments processor, as the term "money transmitter" may not apply to an entity that only acts as a payment processor to facilitate the purchase or payment of a bill for a good or service through a clearance and settlement system by agreement with the creditor or seller, as PPS subsystem 10 may maintain contractual agreements with its merchants and/or may process payments for them via a clearance and settlement system.

PPS subsystem 10 may be operative to receive payments from customer clients (e.g., from a customer client subsystem 100b) in government currency and/or to pay its merchant clients (e.g., a merchant client subsystem 100d) with any distributed ledger digital asset (e.g., bitcoins) from its own reserves (e.g., from memory 13 or otherwise), which may be obtained by a distributed ledger digital asset network of one or more network subsystems (e.g., a distributed ledger digital asset network client subsystem 100a that may be operative to transfer bitcoin to PPS subsystem 10). PPS subsystem 10 may be operative to clear the payments by receiving that government currency from the customer's credit card processor (e.g., from a fiat money asset network client subsystem 100c) and/or to settle the transaction by transmitting an equal value of distributed ledger digital asset (e.g., bitcoin) to the merchant client. This exchange may be a core function of PPS subsystem 10 and may allow for the processing of payments in the manner requested by the merchant.

Additionally or alternatively, PPS subsystem 10 may be operative to accept and transmit funds only integral to the merchant sales. PPS subsystem 10 may accept funds on behalf of its merchants and may transmit those funds only to those merchants. The funds may be integral to the provision of the services provided by the merchant clients of PPS subsystem 10 because the funds may be a customer client's payment for a merchant client's goods and services. The goods or services provided by merchant clients may be any suitable goods or services, such as lodging (e.g., hotels).

Payments made by PPS subsystem 10 may only flow to merchant clients, so customer clients may have no ability to direct that their payments go anywhere besides the merchant from which they are purchasing the good or service. PPS subsystem 10 may only send the merchant client sufficient value to complete the transaction (e.g., the bitcoin equivalent at the time of the transaction of the value paid by the consumer customer client for the good or service). PPS subsystem 10 may be operative to already possess the distributed ledger digital asset (e.g., bitcoins) required to pay a merchant client prior to any transaction with a customer client, such that PPS subsystem 10 may not be exchanging the customer client's money for the distributed ledger digital asset (e.g., bitcoins).

A value proposition of PPS subsystem 10 may provide various value to a merchant client. For example, PPS subsystem 10 may be operative to enable a merchant client to collect payment for goods or services in a distributed ledger digital asset (e.g., bitcoin). By capturing shipping or customer data, PPS subsystem 10 may be operative to link a customer client to an otherwise anonymous distributed ledger digital asset payment. PPS subsystem 10 may be operative to help merchants identify the source of the payments (e.g., by including an identifier of a customer client along with a transaction of funds from PPS subsystem 10 to a merchant client subsystem 100*d*). PPS subsystem 10 may be operative to help a merchant to segregate the access and permissions between the clerks and administrator of an account. PPS subsystem 10 may be operative to help identify distributed ledger digital asset payments in every transaction. PPS subsystem 10 may be operative to help a merchant to convert their distributed ledger digital assets to local currencies with integrations to local exchanges. For example, PPS subsystem 10 may be operative to receive or define payment preferences from a merchant client (e.g., from a merchant client subsystem 100*d*) and may be operative to leverage such payment preferences to pay the merchant (e.g., at step 306, described below) according to those preferences. For example, PPS subsystem 10 may identify that a merchant client prefers to be paid out for a transaction in a particular fiat money asset (e.g., government currency (e.g., centralized real money)). Therefore, rather than paying a merchant in distributed ledger digital asset (e.g., bitcoin) after processing payment from a customer client, PPS subsystem 10 may provide merchant payment in distributed ledger digital asset (e.g., bitcoin) to a distributed ledger digital asset network subsystem (e.g., subsystem 100*a*) that may be operative to convert that distributed ledger digital asset payment into a fiat money currency payment aligned with the preferences of the merchant and send that fiat money currency payment to the merchant (e.g., directly from distributed ledger digital asset network subsystem 100*a* to merchant client subsystem 100*d* (via network 50) or from distributed ledger digital asset network subsystem 100*a* to PPS subsystem 10 and then to merchant client subsystem 100*d* (via network 50), all at step 306 of process 300, as described below). One of many various available distributed ledger digital asset network subsystems 100*a* (e.g., a particular bitcoin exchange 100*a*) may be best suited to convert a distributed ledger digital asset into the currency desired by the merchant. Alternatively, PPS subsystem 10 may identify that a merchant client prefers to be paid out for a transaction in a particular distributed ledger digital asset, and PPS subsystem 10 may directly pay the merchant with the particular distributed ledger digital asset (e.g., bitcoin) after processing payment from a customer client (e.g., merchant client subsystem 100*d* may be operative to receive such distributed ledger digital asset similarly to a distributed ledger digital asset network subsystem 100*a*). Distributed ledger digital asset payout to the merchant by PPS subsystem 10 may be made at a particular time directly to the merchant (e.g., in distributed ledger digital asset) or via a distributed ledger digital asset network subsystem 100*a* (e.g., in any desired fiat money currency). PPS subsystem 10 may be operative to help provide payment tools to facilitate charges with payment buttons, requests by e-mail, and mobile app payments (e.g., APIs or any other suitable tools for enabling a merchant client to provide a customer client with access to the services of PPS subsystem 10 (e.g., via a merchant's website or app running on a customer client subsystem 100*b* or via a point of sale terminal of a merchant client subsystem 100*d* operative to be interacted with by a customer client)). PPS subsystem 10 may be operative to help provide real-time quoting of prices in any distributed ledger digital asset and/or in any fiat money currencies. PPS subsystem 10 may be operative to help a merchant give confidence on the business to consumers.

A service of PPS subsystem 10 may include the following example. A merchant client, such as an entity operative to control merchant client subsystem 100*d*, may be operative to sign up with PPS subsystem 10 to become an approved merchant of system 1 with the goal of using PPS subsystem 10 (e.g., software 15 of PPS subsystem 10) to process credit card payments or distributed ledger digital asset payments or any other suitable payments from its customers. The approval process may include collecting information about the owners, proof of address and business registration, and the like.

A customer client, such as an entity operative to control customer client subsystem 100*b*, that may wish to purchase a good or service from the merchant client (e.g., to pay for a hotel reservation) may be operative to do so by using a merchant website or app that may be operative to contain or run software (e.g., application 119) of PPS subsystem 10 (e.g., via an application programming interface ("API") or the like) or that may be operative to communicate with PPS subsystem 10 in any suitable way to provide payment in any suitable currency or currencies (e.g., in distributed ledger digital asset or in fiat money asset (e.g., via a credit card in the same manner as any other online credit card transaction)).

Software or any other suitable component of PPS subsystem 10 that may be incorporated into or leveraged by a website or app of a merchant client, may take note of the transaction. It may then send (e.g., by request of the merchant client) an appropriate amount of distributed ledger digital asset (e.g., an appropriate number of bitcoins) to the merchant client equal to the value of the fiat money currency paid by the customer client, perhaps minus a processing fee for the benefit of PPS subsystem 10.

Once the merchant client receives the distributed ledger digital asset (e.g., bitcoins), the merchant client can hold the distributed ledger digital asset, spend the distributed ledger digital asset, or convert the distributed ledger digital asset into local fiat money currency. At this point, there may be various technical options provided by system 1 for a merchant client to utilize the payment processing service of PPS subsystem 10. For example, an e-mail invoice (e.g., an indirect option) may be leveraged, whereby a merchant may have the choice of billing a customer via e-mail, where customers may click on a link on an invoice e-mail and enter the payment information themselves, which may be useful for remote pre-payments. As another example, a virtual terminal (e.g., a direct option) may be leveraged, whereby the merchant may log on to an online application or via a mobile device application of PPS subsystem 10 and collect a customer's payment and personal information via a web form, which may be useful for payments at the point of sale. As another example, API integration may be leveraged, whereby a merchant may be provided with a choice to integrate a portion of PPS subsystem 10 into the merchant's front end via an application interface.

With respect to the flow of funds, it is worth noting again that PPS subsystem 10 may be operative to never buy a distributed ledger digital asset (e.g., bitcoins) with merchant money and/or with customer money, and/or PPS subsystem 10 may be operative to never have merchant money in an operational account. One particular flow and/or settlement of a credit card transaction may include PPS subsystem 10 on behalf of and/or via a merchant client (e.g., of client subsystem 100d) being operative to receive a credit card payment from a customer (e.g., from client subsystem 100b). If the charge is approved (e.g., by a fiat money asset network subsystem 100c, such as an issuing bank subsystem or payment network subsystem associated with a particular credit card or other banking instrument of a customer), PPS subsystem 10 may be operative to record the transaction on its account ledger and the funds may be moved from the issuing bank into an escrow account with a payments aggregator of PPS subsystem 10 (e.g., from fiat money asset network subsystem 100c to PPS subsystem 10 (e.g., memory 13 or to some other suitable escrow destination of PPS subsystem 10 (e.g., a third party subsystem or otherwise))). At a settlement date, PPS subsystem 10 may be operative to determine the amount selected by the merchant to be settled to their distributed ledger digital asset wallet (e.g., bitcoin wallet) and PPS subsystem 10 may be operative to pay the merchant the equivalent of the selected amount with previously purchased distributed ledger digital asset (e.g., bitcoin), which may be obtained by PPS subsystem 10 from a distributed ledger digital asset network subsystem 100a (e.g., prior to obtaining payment information from a customer client). For example, PPS subsystem 10 may be operative to pre-purchase distributed ledger digital assets (e.g., bitcoins) with funds of PPS subsystem 10 from an operational account and/or may store them in a buffer pool. PPS subsystem 10 may be operative to pay the merchant client a selected amount minus any appropriate fee that PPS subsystem 10 may be configured to withdraw for its benefit. The payment may be at a rate valid within a settlement window. Then, the settlement may be complete. Any remaining unsettled funds may remain in escrow until the merchant chooses to settle them by repeating the previous steps.

One particular flow and/or settlement of a distributed ledger digital asset (e.g., bitcoin) transaction may include a merchant client of PPS subsystem 10 receiving a distributed ledger digital asset (e.g., bitcoin) payment from a customer client of PPS subsystem 10. Such distributed ledger digital asset (e.g., bitcoin) may be deposited into a temporary distributed ledger digital asset address created by or otherwise accessible to PPS subsystem 10. After a confirmation or after any suitable number (e.g., three) of confirmations, PPS subsystem 10 may be operative to transfer the distributed ledger digital asset (e.g., bitcoins) from the temporary address (e.g., minus a fee, if applicable) to the merchant's distributed ledger digital asset (e.g., bitcoin) wallet, which may be hosted by PPS subsystem 10 (e.g., a merchant may have a Bitcoin wallet that may be hosted in one or more servers or other suitable portion of PPS subsystem 10 and merchants may have the choice to receive the bitcoins in their own wallets outside of servers of PPS subsystem 10).

Therefore, in some embodiments, PPS subsystem 10 may be operative to stand between a merchant and its customers, retaining the customer's fiat money asset payments or government currency-denominated credit card payments and then paying the merchant an equal value in distributed ledger digital asset (e.g., bitcoins), minus a transaction fee. PPS subsystem 10 may be operative to provide payment processing services for merchants that may wish to receive customer payments in a distributed ledger digital asset (e.g., bitcoin) instead of fiat money asset. Though PPS subsystem 10 may be operative in any suitable context, one particular area of use may be in serving the hotel industry in Latin American markets, such as Argentina. Due to currency controls and extreme inflation in this region, many merchants face significant risks when doing business with overseas customers. High credit card processing fees and currency conversion rates can result in losses of 30-50% for some merchants. For these reasons, many merchants in Latin America prefer to receive payment for services in distributed ledger digital asset (e.g., bitcoin) rather than fiat money asset (e.g., government currency, such as pesos). PPS subsystem 10 may be operative to serve this market by enabling its merchant clients to receive distributed ledger digital asset (e.g., bitcoins) in payment for their services, even when their customers pay by credit card denominated in fiat money asset (e.g., government currency). As mentioned, software or data structure 15 or any other suitable component(s) of PPS subsystem 10 may be operative to act as a payment processing service layer that may work in the following manner: (i) a merchant contracts with PPS subsystem 10 to use its service and incorporates the software of PPS subsystem 10 into the merchant's website or app or other suitable merchant-customer interface; (ii) a customer that wishes to reserve a hotel room or purchase a product of the merchant may do so using the website and pays in fiat money asset or government currency via a credit card in the same manner as any other online credit card transaction; (iii) instead of paying the merchant, the software of PPS subsystem 10 may be operative to direct the credit card processor to pay PPS subsystem 10; (iv) PPS subsystem 10 may then be operative to send to the merchant a number of distributed ledger digital asset (e.g., bitcoins) equal to the value of the fiat money asset or government currency paid by the customer, minus a small processing fee; and (v) once the merchant receives the distributed ledger digital asset (e.g., bitcoins), it can hold them, spend them, or convert them into local currency (e.g., fiat money asset or government currency). The distributed ledger digital asset (e.g., bitcoins) paid by PPS subsystem 10 to the merchant may not come from the customer. PPS subsystem 10 may instead purchase the distributed ledger digital asset (e.g., bitcoins) regularly from various distributed ledger digital asset (e.g., bitcoin) sellers (e.g., client subsystem 100a), and may pay for them with its own funds in advance of any merchant transaction (e.g., before (ii) described above). Thus, PPS subsystem 10 may be operative to store a cache of distributed ledger digital asset (e.g., bitcoins) sufficient to settle upcoming transactions, and may take on any risk that the value of the distributed ledger digital asset may drop during that time. PPS subsystem 10 may not enter into any agreement with a merchant's customers. Payments made by PPS subsystem 10 may only flow to the merchant, so the merchant's customer may not direct their payments to any other destination. PPS subsystem 10 may only send the merchant sufficient value to complete the transaction, so it may be operative to never transfer any more value to the merchant than required for the purchase of the good or service. PPS subsystem 10 may be operative to already possess the distributed ledger digital asset (e.g., bitcoins) required to pay the merchant prior to any transaction with a customer, so PPS subsystem 10 may not be exchanging the customer's money for distributed ledger digital asset (e.g., bitcoins). Indeed, the service provided by PPS subsystem 10 may be entirely transparent to the merchant's customers.

DESCRIPTION OF FIG. 3

FIG. 3 is a flowchart of an illustrative process 300. At step 302, a PPS subsystem may be operative to obtain a distributed ledger digital asset from a centralized or decentralized distributed ledger digital asset network subsystem. For example, PPS subsystem 10 may be operative to receive 10 bitcoin or 10 Citicoin from one or more distributed ledger digital asset network subsystems 100a. At step 304, the PPS subsystem may be operative to receive payment from a customer client subsystem (e.g., directly or in conjunction with an associated fiat money asset network subsystem). For example, PPS subsystem 10 may be operative to receive 8 bitcoin from a customer client subsystem 100b, and/or Bitcoin wallet information from a customer client subsystem 100b that may be utilized in conjunction with one or more distributed ledger digital asset network subsystems 100a to receive 8 bitcoin from a wallet of the customer client, and/or credit card information from a customer client subsystem 100b that may be utilized in conjunction with a fiat money asset network subsystem 100c to receive $USD 1,900 payment at PPS subsystem 10. At step 306, the PPS subsystem may be operative to transmit at least a portion of the distributed ledger digital asset from the PPS subsystem to a merchant client subsystem based on the received payment. For example, PPS subsystem 10 may be operative to transmit (e.g., at step 306) at least a portion of the 10 bitcoin obtained from one or more distributed ledger digital asset network subsystems 100a (e.g., at step 302) to a merchant client subsystem 100d based on the received payment (e.g., at step 304) from a customer client subsystem 100b and/or from a fiat money asset network subsystem 100c.

It is understood that the steps shown in process 300 of FIG. 3 are merely illustrative and that existing steps may be modified or omitted, additional steps may be added, and the order of certain steps may be altered.

FURTHER DESCRIPTION OF FIGS. 1-3

It is also understood that a customer client subsystem 100b may be operative as any suitable distributed ledger digital asset network subsystem (e.g., any subsystem 100a) for sending or receiving any suitable distributed ledger digital asset and/or as any suitable fiat money asset network subsystem (e.g., any subsystem 100c) for sending or receiving any suitable fiat money asset. Similarly, it is also understood that a merchant client subsystem 100d may be operative as any suitable distributed ledger digital asset network subsystem (e.g., any subsystem 100a) for sending or receiving any suitable distributed ledger digital asset and/or as any suitable fiat money asset network subsystem (e.g., any subsystem 100c) for sending or receiving any suitable fiat money asset.

One, some, or all of the processes described with respect to FIGS. 1-3 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13 and/or data structure 15 of FIG. 1 and/or memory 113 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from a PPS subsystem to a client subsystem, from a client subsystem to a PPS subsystem, and/or from one client subsystem to another client subsystem using any suitable communications protocol (e.g., the computer-readable medium may be communicated to a client subsystem 100 via communications component 14/114 (e.g., as at least a portion of an application 119)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of the disclosure may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

While there have been described systems, methods, and computer-readable media for a payment processing service utilizing a distributed ledger digital asset, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
    prior to obtaining, at a payment processing subsystem, any currency associated with a particular customer client, obtaining, at a temporary distributed ledger digital asset address of the payment processing subsystem, a distributed ledger digital asset from a distributed ledger digital asset network subsystem that is remote from the payment processing subsystem;
    after the obtaining the distributed ledger digital asset, receiving payment, at the payment processing subsystem, from at least one of a customer client subsystem of the particular customer client, wherein the customer client subsystem is remote from the payment processing subsystem, or a fiat money asset network subsystem on behalf of the particular customer client, wherein the fiat money asset network subsystem is remote from the payment processing subsystem; and after receiving the payment, transmitting at least a portion of the obtained distributed ledger digital asset from the temporary distributed ledger digital asset address of the payment processing subsystem to a merchant client subsystem based on the received payment, wherein the merchant client subsystem is remote from the payment processing subsystem.

2. The method of claim 1, wherein the distributed ledger digital asset network subsystem is a centralized distributed ledger digital asset network subsystem.

3. The method of claim 1, wherein the distributed ledger digital asset network subsystem is a decentralized distributed ledger digital asset network subsystem.

4. The method of claim 1, wherein receiving payment at the payment processing subsystem comprises receiving payment at the payment processing subsystem from a customer client subsystem of the particular customer client.

5. The method of claim 4, wherein the distributed ledger digital asset network subsystem is a centralized distributed ledger digital asset network subsystem.

6. The method of claim 4, wherein the distributed ledger digital asset network subsystem is a decentralized distributed ledger digital asset network subsystem.

7. The method of claim 1, wherein receiving payment at the payment processing subsystem comprises receiving payment at the payment processing subsystem from a fiat money asset network subsystem on behalf of the particular customer client.

8. The method of claim 7, wherein the distributed ledger digital asset network subsystem is a centralized distributed ledger digital asset network subsystem.

9. The method of claim 7, wherein the distributed ledger digital asset network subsystem is a decentralized distributed ledger digital asset network subsystem.

10. The method of claim 1, wherein the value of the at least a portion of the distributed ledger digital asset is no more than the value of the received payment at the time of the receiving.

11. The method of claim 1, wherein the value of the at least a portion of the distributed ledger digital asset is no more than the value of the received payment at the time of the transmitting.

12. The method of claim 1, wherein the value of the at least a portion of the distributed ledger digital asset is less than the value of the received payment at the time of the receiving.

13. The method of claim 12, further comprising, retaining at the payment processing subsystem the difference between the value of the at least a portion of the distributed ledger digital asset and the value of the received payment at the time of the receiving.

14. The method of claim 1, wherein the value of the at least a portion of the distributed ledger digital asset is less than the value of the received payment at the time of the transmitting.

15. The method of claim 14, further comprising, retaining at the payment processing subsystem the difference between the value of the at least a portion of the distributed ledger digital asset and the value of the received payment at the time of the transmitting.

16. The method of claim 1, wherein transmitting comprises transmitting the at least a portion of the distributed ledger digital asset and an identification of the source of the received payment from the payment processing subsystem to the merchant client subsystem based on the received payment.

17. A payment processor subsystem comprising:
a communications component; and
a processor operative to:
purchase, by the payment processor subsystem, via the communications component, a distributed ledger digital asset from a first remote subsystem for a wallet of the payment processor subsystem before any currency is received, by the payment processor subsystem, via the communications component, from a second remote subsystem of a particular customer, wherein the first remote subsystem is remote from the payment processor subsystem, wherein the second remote subsystem is remote from the payment processor subsystem, and wherein the first remote subsystem is remote from the second remote subsystem;
after the distributed ledger digital asset is purchased, receive, via the communications component, payment from the second remote subsystem of the particular customer; and
after the payment is received, transmit, via the communications component, at least a portion of the purchased distributed ledger digital asset from the wallet of the payment processor subsystem to a third remote subsystem based on the payment, wherein the third remote subsystem is remote from the payment processor subsystem.

18. The payment processor subsystem of claim 17, wherein the processor is further operative to transmit, via the communications component, along with the at least a portion of the distributed ledger digital asset, an identification of the second remote subsystem of the particular customer to the third remote subsystem.

19. A non-transitory computer-readable medium comprising computer-readable instructions recorded thereon for:
prior to receiving, at a payment processing subsystem, any value from a particular customer client, obtaining, at a distributed ledger digital asset address of the payment processing subsystem, a distributed ledger digital asset from a distributed ledger digital asset network subsystem that is remote from the payment processing subsystem;
after obtaining the distributed ledger digital asset, receiving payment, at the payment processing subsystem, from at least one of a customer client subsystem of the particular customer client, wherein the customer client subsystem is remote from the payment processing subsystem, or a fiat money asset network subsystem on behalf of the particular customer client, wherein the fiat money asset network subsystem is remote from the payment processing subsystem; and
transmitting at least a portion of the obtained distributed ledger digital asset from the distributed ledger digital asset address of the payment processing subsystem to a merchant client subsystem based on the received payment, wherein the merchant client subsystem is remote from the payment processing subsystem.

* * * * *